(12) United States Patent
Osterhout (10) Patent No.: US 12,405,470 B2
(45) Date of Patent: *Sep. 2, 2025

(54) SEE-THROUGH COMPUTER DISPLAY SYSTEMS WITH VISION CORRECTION AND INCREASED CONTENT DENSITY

(71) Applicant: Mentor Acquisition One, LLC, Plantation, FL (US)

(72) Inventor: Ralph F. Osterhout, San Francisco, CA (US)

(73) Assignee: Mentor Acquisition One, LLC, Plantation, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/420,611

(22) Filed: Jan. 23, 2024

(65) Prior Publication Data

US 2024/0160021 A1 May 16, 2024

Related U.S. Application Data

(63) Continuation of application No. 17/528,059, filed on Nov. 16, 2021, now Pat. No. 11,988,837, which is a continuation of application No. 16/393,851, filed on Apr. 24, 2019, now Pat. No. 11,204,501.

(60) Provisional application No. 62/661,720, filed on Apr. 24, 2018.

(51) Int. Cl.
| | |
|---|---|
| *G02F 1/153* | (2006.01) |
| *G02B 1/14* | (2015.01) |
| *G02B 27/01* | (2006.01) |
| *G02C 7/10* | (2006.01) |
| *G02F 1/163* | (2006.01) |

(52) U.S. Cl.
CPC ............ *G02B 27/0172* (2013.01); *G02B 1/14* (2015.01); *G02C 7/101* (2013.01); *G02C 7/102* (2013.01); *G02F 1/163* (2013.01); *G02B 2027/0118* (2013.01); *G02B 2027/0174* (2013.01); *G02B 2027/0178* (2013.01)

(58) Field of Classification Search
CPC ...................................................... G02F 1/153
See application file for complete search history.

(56) References Cited

U.S. PATENT DOCUMENTS

| | | | |
|---|---|---|---|
| 4,852,988 | A | 8/1989 | Velez |
| 6,170,952 | B1 | 1/2001 | La |
| 6,433,760 | B1 | 8/2002 | Vaissie |

(Continued)

FOREIGN PATENT DOCUMENTS

| | | | |
|---|---|---|---|
| CA | 2316473 | A1 | 1/2001 |
| CA | 2362895 | A1 | 12/2002 |

(Continued)

OTHER PUBLICATIONS

Japanese Office Action mailed Jul. 31, 2024, for JP Application No. 2023-095442, with English translation, 4 pages.

(Continued)

*Primary Examiner* — Joseph P Martinez
(74) *Attorney, Agent, or Firm* — Morrison & Foerster LLP (57) ABSTRACT

Provided herein are examples of an impact resistant glass-waveguide configuration for a see-through head-worn computer display. In embodiments, the configuration includes vision correction and content density control through electrochromic and/or photochromic systems.

7 Claims, 4 Drawing Sheets

(56) References Cited

U.S. PATENT DOCUMENTS

| | | |
|---|---|---|
| 6,491,391 B1 | 12/2002 | Blum et al. |
| 6,847,336 B1 | 1/2005 | Lemelson |
| 6,943,754 B2 | 9/2005 | Aughey |
| 6,977,776 B2 | 12/2005 | Volkenandt et al. |
| 7,347,551 B2 | 3/2008 | Fergason et al. |
| 7,488,294 B2 | 2/2009 | Torch |
| 7,758,185 B2 | 7/2010 | Lewis |
| 8,235,529 B1 | 8/2012 | Raffle |
| 8,353,594 B2 | 1/2013 | Lewis |
| 8,611,015 B2 | 12/2013 | Wheeler |
| 8,638,498 B2 | 1/2014 | Bohn et al. |
| 8,696,113 B2 | 4/2014 | Lewis |
| 8,733,927 B1 | 5/2014 | Lewis |
| 8,733,928 B1 | 5/2014 | Lewis |
| 8,929,589 B2 | 1/2015 | Publicover et al. |
| 9,010,929 B2 | 4/2015 | Lewis |
| 9,235,064 B2 | 1/2016 | Lewis |
| 9,239,473 B2 | 1/2016 | Lewis |
| 9,244,293 B2 | 1/2016 | Lewis |
| 9,274,338 B2 | 3/2016 | Robbins et al. |
| 9,292,973 B2 | 3/2016 | Bar-zeev et al. |
| 9,323,325 B2 | 4/2016 | Perez et al. |
| 9,658,473 B2 | 5/2017 | Lewis |
| 9,720,505 B2 | 8/2017 | Gribetz et al. |
| 10,013,053 B2 | 7/2018 | Cederlund et al. |
| 10,025,379 B2 | 7/2018 | Drake et al. |
| 10,151,937 B2 | 12/2018 | Lewis |
| 10,185,147 B2 | 1/2019 | Lewis |
| 11,204,501 B2 | 12/2021 | Osterhout |
| 11,988,837 B2 * | 5/2024 | Osterhout .......... G02B 27/0172 |
| 2003/0030597 A1 | 2/2003 | Geist |
| 2006/0023158 A1 | 2/2006 | Howell et al. |
| 2007/0008624 A1 | 1/2007 | Hirayama |
| 2011/0211056 A1 | 9/2011 | Publicover et al. |
| 2011/0213664 A1 | 9/2011 | Osterhout |
| 2011/0221656 A1 | 9/2011 | Haddick |
| 2012/0021806 A1 | 1/2012 | Maltz |
| 2013/0077147 A1 | 3/2013 | Efimov |
| 2013/0286053 A1 | 10/2013 | Fleck et al. |
| 2014/0011829 A1 | 1/2014 | Steele |
| 2014/0195918 A1 | 7/2014 | Friedlander |
| 2015/0168731 A1 | 6/2015 | Robbins |
| 2015/0277126 A1 | 10/2015 | Hirano et al. |
| 2016/0055822 A1 * | 2/2016 | Bell ..................... G02B 27/017 345/207 |
| 2016/0170209 A1 | 6/2016 | Border |
| 2017/0192238 A1 | 7/2017 | Riedel et al. |
| 2017/0220865 A1 | 8/2017 | Osterhout |
| 2017/0344114 A1 | 11/2017 | Osterhout |
| 2018/0011324 A1 | 1/2018 | Popovich |
| 2019/0278086 A1 | 9/2019 | Ofir |
| 2022/0075197 A1 | 3/2022 | Osterhout |

FOREIGN PATENT DOCUMENTS

| | | |
|---|---|---|
| CA | 2388766 A1 | 12/2003 |
| CN | 102906623 A | 1/2013 |
| CN | 106662747 A | 5/2017 |
| JP | 2009145513 A | 7/2009 |
| JP | 2015184560 A | 10/2015 |
| JP | 2017514172 A | 6/2017 |
| WO | 2005088384 A1 | 9/2005 |
| WO | 2012118573 A1 | 9/2012 |
| WO | 2017157807 A2 | 9/2017 |
| WO | 2017199232 A1 | 11/2017 |
| WO | 2017223121 A1 | 12/2017 |
| WO | 2019226269 A2 | 11/2019 |

OTHER PUBLICATIONS

Chinese Office Action dated Jan. 6, 2023, for CN Application No. 201980028437.7, with English translation, 18 pages.

Chinese Office Action dated May 9, 2022, for CN Application No. 201980028437.7, with English translation, 12 pages.

European Office Action dated Sep. 15, 2023, for EP Application No. 19807779.4, seven pages.

Extended European Search Report dated May 27, 2021, for EP Application No. 19807779.4, eight pages.

International Preliminary Report on Patentability dated Oct. 27, 2020, for PCT Application No. PCT/US2019/28999, filed Apr. 24, 2019, six pages.

International Search Report and Written Opinion, mailed Dec. 27, 2019, for PCT Application No. PCT/US2019/28999, filed Apr. 24, 2019, eight pages.

Jacob, R. "Eye Tracking in Advanced Interface Design", Virtual Environments and Advanced Interface Design, Oxford University Press, Inc. (Jun. 1995).

Japanese Final Office Action mailed Sep. 29, 2023, for JP Application No. 2020-560406, with English translation, 15 pages.

Japanese Office Action mailed Mar. 10, 2023, for JP Application No. 2020 560406, with English translation, 8 pages.

Non-Final Office Action mailed Apr. 15, 2021, for U.S. Appl. No. 16/393,851, filed Apr. 24, 2019, 16 pages.

Non-Final Office Action mailed May 25, 2023, for U.S. Appl. No. 17/528,059, filed Nov. 16, 2021, five pages.

Notice of Allowance mailed Aug. 16, 2021, for U.S. Appl. No. 16/393,851, filed Apr. 24, 2019, nine pages.

Notice of Allowance mailed Dec. 21, 2023, for U.S. Appl. No. 17/528,059, filed Nov. 16, 2021, eight pages.

Rolland, J. et al., "High-resolution inset head-mounted display", Optical Society of America, vol. 37, No. 19, Applied Optics, (Jul. 1, 1998).

Tanriverdi, V. et al. (Apr. 2000). "Interacting With Eye Movements In Virtual Environments," Department of Electrical Engineering and Computer Science, Tufts University, Medford, MA 02155, USA, Proceedings of the SIGCHI conference on Human Factors in Computing Systems, eight pages.

Yoshida, A. et al., "Design and Applications of a High Resolution Insert Head Mounted Display", (Jun. 1994).

Japanese Office Action mailed May 2, 2025, for JP Application No. 2023-095442, with English translation, 3 pages.

* cited by examiner

SEE-THROUGH COMPUTER DISPLAY SYSTEMS WITH VISION CORRECTION AND INCREASED CONTENT DENSITY

CROSS-REFERENCE TO RELATED APPLICATION

This application is a continuation of U.S. application Ser. No. 17/528,059, filed Nov. 16, 2021, which is a continuation of U.S. application Ser. No. 16/393,851, filed on Apr. 24, 2019, now U.S. Pat. No. 11,204,501, issued Dec. 21, 2021, which claims the benefit under 35 U.S.C. § 119(e) of U.S. Provisional Patent Application No. 62/661,720, filed Apr. 24, 2018, the contents of all of which are incorporated by reference herein in their entirety.

BACKGROUND

Field of the Invention

This invention relates to see-through computer display systems with vision correction and/or increased content density.

Description of Related Art

Head mounted displays (HMDs) and particularly HMDs that provide a see-through view of the environment are valuable instruments. The presentation of content in the see-through display can be a complicated operation when attempting to ensure that the user experience is optimized. Improved systems and methods for presenting content in the see-through display can improve the user experience.

SUMMARY

Aspects of the present invention relate to methods and systems for the see-through computer display systems with waveguides that include a vision corrective and increased content density by reducing scene light.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE DRAWINGS

Embodiments are described with reference to the following Figures.

The same numbers may be used throughout to reference like features and components that are shown in the Figures.

While the invention has been described in connection with certain preferred embodiments, other embodiments would be understood by one of ordinary skill in the art and are encompassed herein.

DETAILED DESCRIPTION OF THE PREFERRED EMBODIMENT(S)

Aspects of the present invention relate to head-worn computing ("HWC") systems. HWC involves, in some instances, a system that mimics the appearance of head-worn glasses or sunglasses. The glasses may be a fully developed computing platform, such as including computer displays presented in each of the lenses of the glasses to the eyes of the user. In embodiments, the lenses and displays may be configured to allow a person wearing the glasses to see the environment through the lenses while also seeing, simultaneously, digital imagery, which forms an overlaid image that is perceived by the person as a digitally augmented image of the environment, or augmented reality ("AR").

HWC involves more than just placing a computing system on a person's head. The system may need to be designed as a lightweight, compact and fully functional computer display, such as wherein the computer display includes a high resolution digital display that provides a high level of emersion comprised of the displayed digital content and the see-through view of the environmental surroundings. User interfaces and control systems suited to the HWC device may be required that are unlike those used for a more conventional computer such as a laptop. For the HWC and associated systems to be most effective, the glasses may be equipped with sensors to determine environmental conditions, geographic location, relative positioning to other points of interest, objects identified by imaging and movement by the user or other users in a connected group, and the like. The HWC may then change the mode of operation to match the conditions, location, positioning, movements, and the like, in a method generally referred to as a contextually aware HWC. The glasses also may need to be connected, wirelessly or otherwise, to other systems either locally or through a network. Controlling the glasses may be achieved through the use of an external device, automatically through contextually gathered information, through user gestures captured by the glasses sensors, and the like. Each technique may be further refined depending on the software application being used in the glasses. The glasses may further be used to control or coordinate with external devices that are associated with the glasses.

Figure 1:
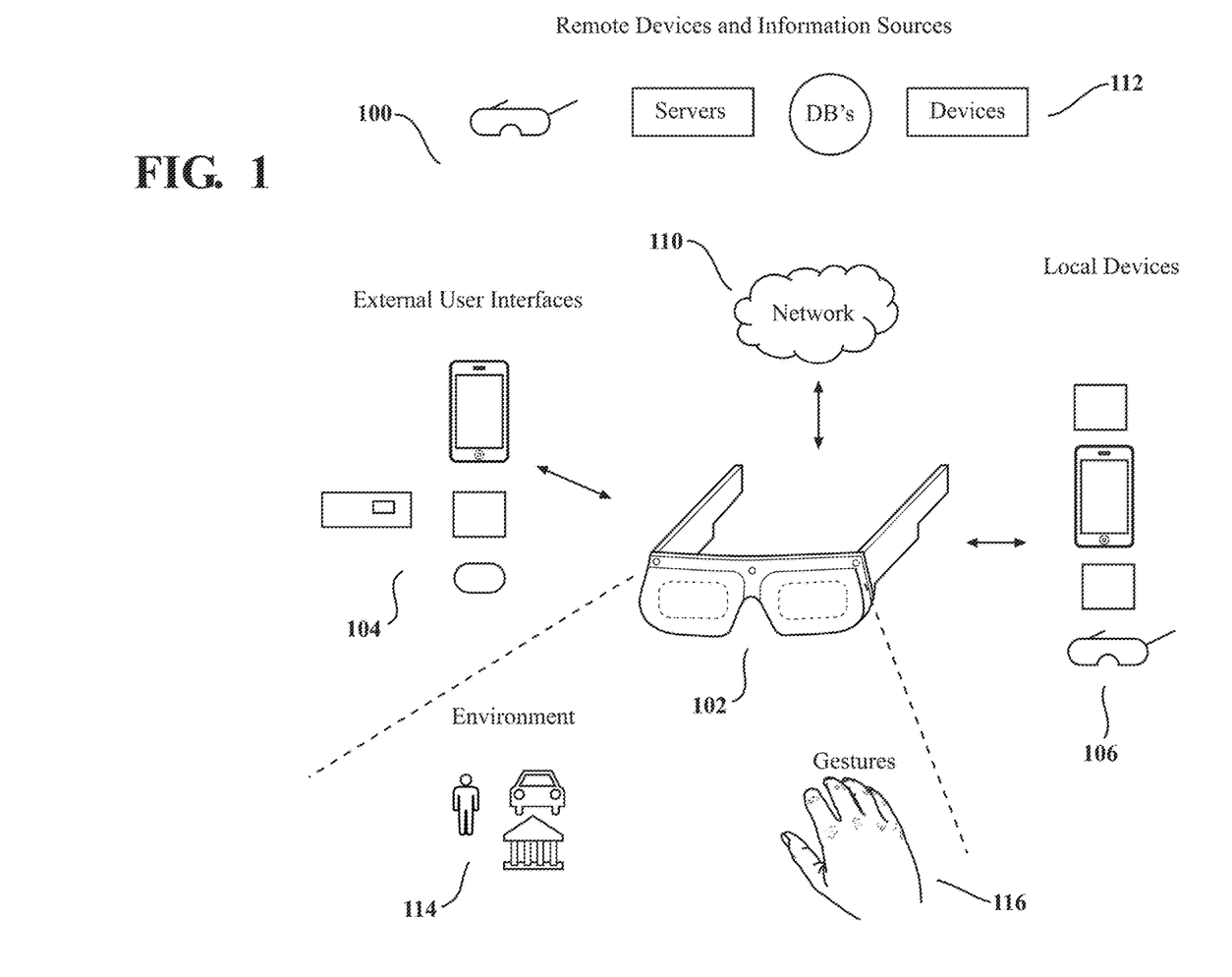
FIG. 1 illustrates a head-worn computer ecosystem in accordance with the principles of the present invention.

Referring to FIG. 1, an overview of the HWC system 100 is presented. As shown, the HWC system 100 comprises a HWC 102, which in this instance is configured as glasses to be worn on the head with sensors such that the HWC 102 is aware of the objects and conditions in the environment 114. In this instance, the HWC 102 also receives and interprets control inputs such as gestures and movements 116. The HWC 102 may communicate with external user interfaces 104. The external user interfaces 104 may provide a physical user interface to take control instructions from a user of the HWC 102 and the external user interfaces 104 and the HWC 102 may communicate bi-directionally to affect the user's command and provide feedback to the external device 108. The HWC 102 may also communicate bi-directionally with externally controlled or coordinated local devices 108. For example, an external user interface 104 may be used in connection with the HWC 102 to control an externally controlled or coordinated local device 108. The externally controlled or coordinated local device 108 may provide feedback to the HWC 102 and a customized GUI may be presented in the HWC 102 based on the type of device or specifically identified device 108. The HWC 102 may also interact with remote devices and information sources 112 through a network connection 110. Again, the external user interface 104 may be used in connection with the HWC 102 to control or otherwise interact with any of the remote devices 108 and information sources 112 in a similar way as when the external user interfaces 104 are used to control or otherwise interact with the externally controlled or coordinated local devices 108. Similarly, HWC 102 may interpret gestures 116 (e.g. captured from forward, downward, upward, rearward facing sensors such as camera(s), range finders, IR sensors, etc.) or environmental conditions sensed in the environment 114 to control either local or remote devices 108 or 112.

We will now describe each of the main elements depicted on FIG. 1 in more detail; however, these descriptions are intended to provide general guidance and should not be construed as limiting. Additional description of each element may also be further described herein.

The HWC 102 is a computing platform intended to be worn on a person's head. The HWC 102 may take many different forms to fit many different functional requirements. In some situations, the HWC 102 will be designed in the form of conventional glasses. The glasses may or may not have active computer graphics displays. In situations where the HWC 102 has integrated computer displays the displays may be configured as see-through displays such that the digital imagery can be overlaid with respect to the user's view of the environment 114. There are a number of see-through optical designs that may be used, including ones that have a reflective display (e.g. LCoS, DLP), emissive displays (e.g. OLED, micro-LED), holographic surfaces, TIR waveguides, and the like. In embodiments, lighting systems used in connection with the display optics may be solid state lighting systems, such as LED, OLED, quantum dot, quantum dot LED, etc. In addition, the optical configuration may be monocular or binocular. It may also include vision corrective optical components. In other embodiments, the HWC 102 may be in the form of a helmet with a see-through shield, sunglasses, safety glasses, goggles, a mask, fire helmet with see-through shield, police helmet with see through shield, military helmet with see-through shield, utility form customized to a certain work task (e.g. inventory control, logistics, repair, maintenance, etc.), and the like.

The HWC 102 may also have a number of integrated computing facilities, such as an integrated processor, integrated power management, communication structures (e.g. cell net, WiFi, Bluetooth, local area connections, mesh connections, remote connections (e.g. client server, etc.)), and the like. The HWC 102 may also have a number of positional awareness sensors, such as GPS, electronic compass, altimeter, tilt sensor, IMU, and the like. It may also have other sensors such as a camera, rangefinder, hyperspectral camera, Geiger counter, microphone, spectral illumination detector, temperature sensor, chemical sensor, biologic sensor, moisture sensor, ultrasonic sensor, and the like.

The HWC 102 may also have integrated control technologies. The integrated control technologies may be contextual based control, passive control, active control, user control, and the like. For example, the HWC 102 may have an integrated sensor (e.g. camera) that captures user hand or body gestures 116 such that the integrated processing system can interpret the gestures and generate control commands for the HWC 102. In another example, the HWC 102 may have sensors that detect movement (e.g. a nod, head shake, and the like) including accelerometers, gyros and other inertial measurements, where the integrated processor may interpret the movement and generate a control command in response. The HWC 102 may also automatically control itself based on measured or perceived environmental conditions. For example, if it is bright in the environment the HWC 102 may increase the brightness or contrast of the displayed image. In embodiments, the integrated control technologies may be mounted on the HWC 102 such that a user can interact with it directly. For example, the HWC 102 may have a button(s), touch capacitive interface, and the like.

As described herein, the HWC 102 may be in communication with external user interfaces 104. The external user interfaces may come in many different forms. For example, a cell phone screen may be adapted to take user input for control of an aspect of the HWC 102. The external user interface may be a dedicated UI, such as a keyboard, touch surface, button(s), joy stick, and the like. In embodiments, the external controller may be integrated into another device such as a ring, watch, bike, car, and the like. In each case, the external user interface 104 may include sensors (e.g. IMU, accelerometers, compass, altimeter, and the like) to provide additional input for controlling the HWD 104.

As described herein, the HWC 102 may control or coordinate with other local devices 108. The external devices 108 may be an audio device, visual device, vehicle, cell phone, computer, and the like. For instance, the local external device 108 may be another HWC 102, where information may then be exchanged between the separate HWCs 108.

Similar to the way the HWC 102 may control or coordinate with local devices 106, the HWC 102 may control or coordinate with remote devices 112, such as the HWC 102 communicating with the remote devices 112 through a network 110. Again, the form of the remote device 112 may have many forms. Included in these forms is another HWC 102. For example, each HWC 102 may communicate its GPS position such that all the HWCs 102 know where all of HWC 102 are located.

Figure 2:
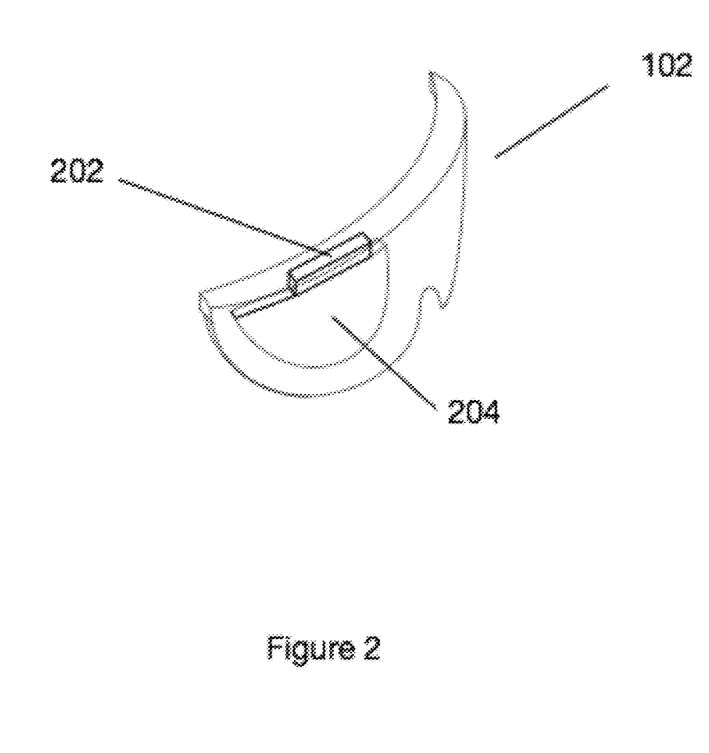
FIG. 2 illustrates a head worn computing system with optical system in accordance with the principles of the present invention.

FIG. 2 illustrates a HWC 102 with an optical system that includes an image production module 202 and an image transfer optical module 204. While the modules 202 and 204 will generally be described as separate modules, it should be understood that this is illustrative only and the present invention includes other physical configurations, such as that when the two modules are combined into a single module or where the elements making up the two modules are configured into more than two modules. In embodiments, the image production module 202 includes a computer controlled display (e.g. LCoS, DLP, OLED, micro-LED etc.) and be arranged to transmit or project image light to the image transfer optical module 204. In embodiments, the image transfer optical module 204 includes eye delivery optics that are configured to receive the image light and deliver the image light to the eye of a wearer of the HWC. The transfer optical module may include reflective, refractive, holographic, TIR, etc. surfaces. It should be noted that while the optical modules 202 and 204 are illustrated in one side of the HWC such that image light can be delivered to one eye of the wearer, that it is envisioned by the present invention that embodiments will contain two image light delivery systems, one for each eye. It should also be noted that while the image production module 202 is depicted in FIG. 2 as above the image transfer module 204, the inventors envision other configurations as well. The image may be projected to the image transfer module 204 from the top, bottom side, at a corner, from behind, from the front, etc. These configurations may depend on what optics are included in the module.

Figure 3:
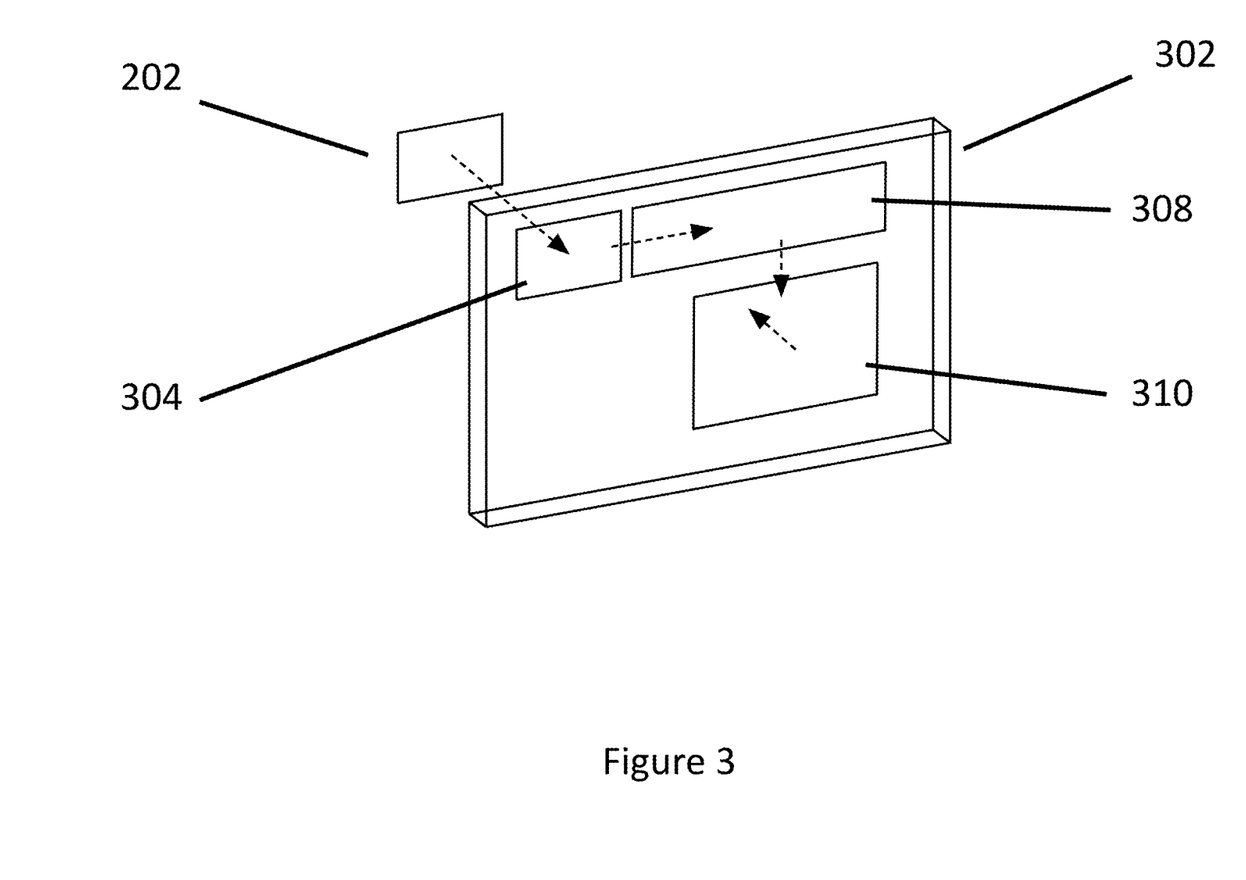
FIG. 3 illustrates an exemplary image transfer module in accordance with the principles of the present invention.

FIG. 3 illustrates a specific type of image transfer module 204. It illustrates a waveguide with image light direction surfaces 302 to direct the image light within the waveguide. There are a number of different types of waveguides with image light direction surfaces: holographic, single layer holographic, multi-layer holographic, thick film holographic, outer surface holographic, prism, surface relief, active holographic, etc. Reference, which is incorporated herein, is made to https://uploadvr.com/waveguides-smart-glasses/to provide some examples of waveguides with direction surfaces. In the example illustrated in FIG. 3, an image production module 202 projects light into an area of the waveguide 302 that includes an input surface 304 adapted to re-direct the image light internally, through total internal reflection (TIR), to a fold surface 308 that redirects the image light within the waveguide 302 to an output surface 310 that is adapted to re-direct the light out of the waveguide 302 towards a user's eye. The input surface and output surface, in embodiments, are further designed to expand the image light such that, once redirected out of the waveguide 302, it forms a large field of view for the user. Each of the surfaces 304, 308 and 310 may be prisms, holographic, active, passive, many layered, single layered, internal to the waveguide, external to the waveguide, etc. The example provided in FIG. 3 is merely exemplary in nature to help the reader understand that there are various types of waveguides with directional surfaces to manage the image light. Further to that point, while the illustrated configuration shows a particular arrangement and orientation of the image production module, the waveguide and the various surfaces, it should be understood that the inventors envision that there are other configurations that work and the configuration generally depends on the finished product's requirements.

Figure 4:
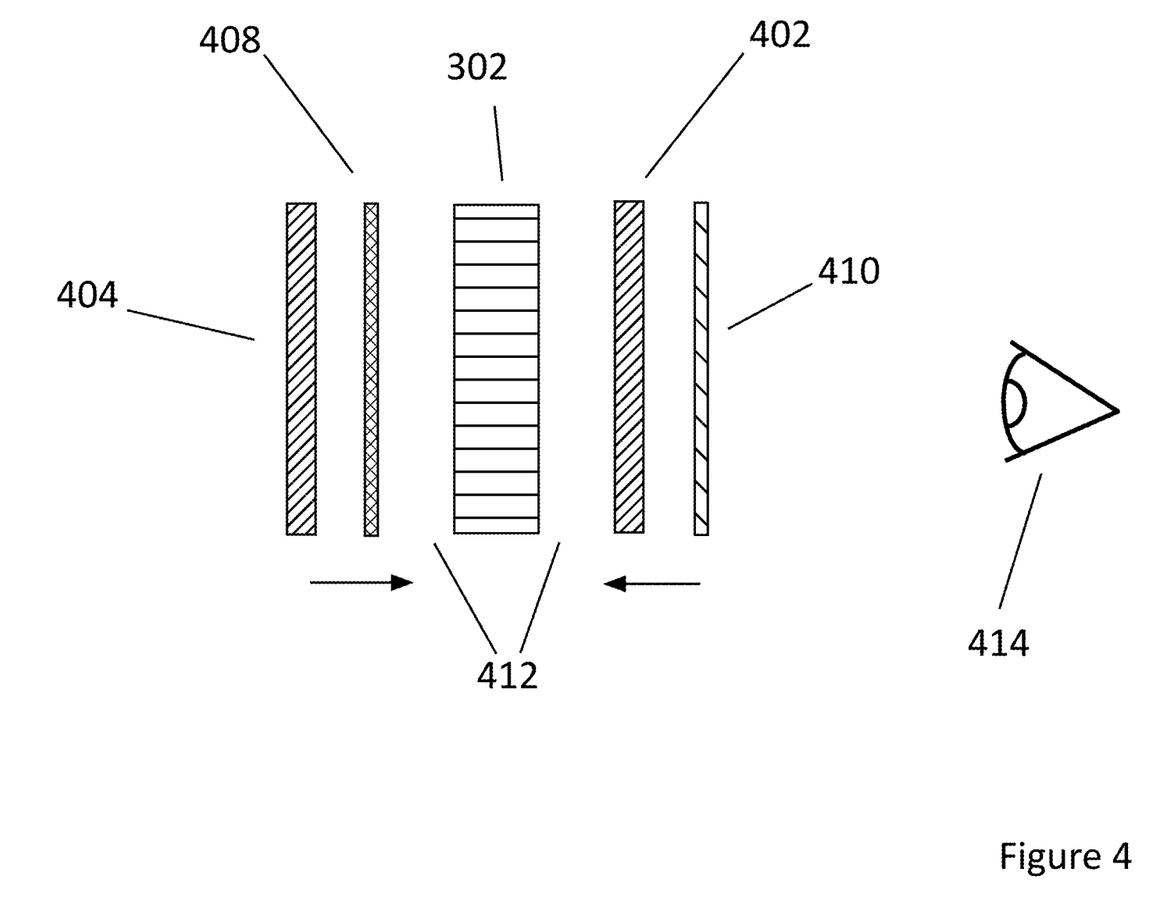
FIG. 4 illustrates a waveguide construction with vision correction and increased content density through controlled scene light transmission in accordance with the principles of the present invention.

FIG. 4 illustrates a waveguide construction with vision correction and increased content density through controlled scene light transmission in accordance with the principles of the present invention. The inventors discovered that waveguides, while useful and a very good form factor for smart-glasses, are fragile because they are made of glass. They are also expensive, so breaking them in a pair of glasses is not good. In addition, because they are glass, any breakage could result in an eye injury for the user. The embodiment illustrated in FIG. 4 hardens the waveguide such that it is less susceptible to breakage and/or impacts. In addition, the embodiment in FIG. 4 provides a waveguide see-through augmented reality solution with a corrective vision element and increased content density due to the controlling of scene lighting that provides back lighting to content provided through the waveguide.

The waveguide 302 of FIG. 4 is part of an assembly once the other components in the illustration are added. As illustrated, the several components stack together to form, at least a portion of, an example of an image transfer module 204. The stack includes the waveguide 302 with an inner protective layer (e.g. polycarbonate, protective plate, etc.) 402, which is on the user's eye 414 side of the stack. The stack also includes an outer protective layer (e.g. polycarbonate, protective plate, etc.) 404 on the opposite side of the waveguide 302. In embodiments, an air gap 412 is maintained on each side of the waveguide 302 such that the waveguide operates properly. That is, the stacking of optical elements includes an air gap on both sides of the waveguide such that the total internal reflection nature of the reflections inside of the waveguide are not disrupted. The air gap 412 preserves the substantial index of refraction difference between the material waveguide 302 and the transition to the next material.

The optical stack of FIG. 4 further includes a vision correction optic 410 (e.g. a molded elastomeric that sticks to the inner protective layer 402 through surface adhesion, a glass or plastic vision correction optic that is adhered to the protective inner layer 402, etc.) The vision correction optic is meant to correct the user's vision in the same way as other prescription lenses, but in this embodiment, it is placed on the inner protective layer 402 so it will correct the user's view of not only the surrounding environment but also the content presented through the waveguide 302. In embodiments, the vision corrective optic 410 is a molded elastomeric that sticks to the inner protective layer 402 through surface adhesion. This allows for quick and easy application of a vision correction optic 410 that is made specifically for the user. An ophthalmologist, or other prescriber of corrective lenses, could make and sell correctives that could then be applied by the user by essentially sticking the optic onto an outside surface of the inner protective layer 402. Of course, in situations where a prescriber is not required, the user may simply purchase a corrective and apply it to the inner protective layer 402 (e.g. a 'reader' optic for increased magnification). In embodiments, it is important to have a vertical and planar waveguide 302 and/or vertical and planar (e.g. planar at least over the surface where the vision corrective optic 410 is to be mounted) inner protective layer 402 positioned in front of the user's eye for the vision corrective optic 410 to work properly. When the waveguide 302 is positioned substantially vertically, image light transmits from the waveguide at substantially 90 degrees from the waveguide surface towards the user's eye. This is because typical vision corrective optics 410 are optically designed to be looked through when they are positioned vertically. This avoids needing to make a very complicated prescription on the vision correction optic 410 to compensate for the angle through which the user would be viewing. In an alternate embodiment, if the waveguide 302 is on an angle off of vertical, the inner protective layer 402 may include an angle on it's outer surface (i.e. closest to the eye 414) or be mounted on an angle with respect to the waveguide 302 such that when the vision corrective optic is attached, it is vertical with respect to the user's eye 414. In embodiments, the inner protective layer 402 may include one or more markings, or a template may be provided, to help a user with the alignment of the vision correction optic 410.

In embodiments, the inner protective layer 402 may itself include a vision corrective portion. The inner protective layer could be formed out of polycarbonate, or other suitable material, and shaped into the corrective prescription for the user. Then the vision corrected inner protective layer could be attached to the waveguide 302 such that the air gap 412 is preserved. This would eliminate the need for a separate material to be applied to the inner protective layer 402. Of course, this configuration may require a more involved manufacturing or user process for installing the vision corrected inner protective layer 402.

As illustrated in FIG. 4, in embodiments, the stack may include an outer protective layer 404 that is positioned to provide an air gap 412 between the outer protective layer 404 and the waveguide 302 to preserve the proper total internal reflections of the waveguide when it is delivering computer content to the user's eye in a head-mounted see-through computer display. The stack may also include an electrochromic layer 408 that may be controlled by a processor in the head-worn computer 102. The electrochromic layer may be computer controlled to quickly reduce or increase the amount of scene light reaching the waveguide 302. The scene light essentially forms background light for the computer images presented in the waveguide 302 because of the see-through nature of the waveguide 302. With high transmissivity on the outside of the waveguide 302 (i.e. the opposite side of the user's eye) computer content presented in the waveguide 302 may be transparent and/or require a high brightness for the content to overcome the scene light. With the electrochromic layer 408 activated to provide dimming of the scene light, the computer content may be less transparent and/or the brightness of the content may be reduced because there is not as much scene light to overcome. In embodiments, the electrochromic layer 408 is applied directly to the outer protective layer 404. In other embodiments, the electrochromic layer 408 is applied to an intermediate layer.

The inventors discovered that when applying electrochromic surfaces to glasses formats, there are significant difficulties. The electrochromic surface tends to not apply well to complicated shapes, including compound radiuses like a standard corrective glass lens or sunglass lens. It becomes somewhat easier to apply the surface to a single curve in a surface. It is easiest and produces the best results when it is applied to a flat planar surface. In embodiments, the air gap design described herein may be used in connection with any shaped electrochromic surface.

In embodiments, the outer protective layer 404 may include photochromic material(s). This would provide auto-dimming of the scene light based on the intensity of the scene light. A photochromic layer may be provided in a separate layer on either side of the outer protective layer. Typically, the photochromic layer would be positioned further from the user's eye than the electrochromic layer such that the electrochromic layer did not have an effect of the performance of the photochromic layer.

In embodiments, anti-reflective coatings may be applied to any or all of the optical stack's surfaces illustrated in connection with FIG. 4 that are exposed to air in the final assembly to prevent reflections during use of the head-worn computer 102 to prevent distracting reflections.

In embodiments, inner and outer protective layer 402 and 408 may be applied to the waveguide 302 without leaving the air gaps 412 by using a material for the protective layers that substantially matches the index of refraction of the material used for the waveguide 302. By using an index matching material, the total internal reflection of the waveguide may use the outer surfaces of the protective layers. In such a configuration, an air gap may be provided between the inner protective layer 402 and the corrective optic 410. Further, in such a configuration an air gap may be provided between the outer protective layer 404 and the electrochromic layer 408.

In embodiments, the waveguide 302, or portions thereof, may be made of chemically treated glass to increase the waveguides strength (e.g. Gorilla Glass).

In an embodiment, a head-worn see-through computer display, may include a glass waveguide having a first inner surface, the first inner surface having a planar area at least in a region where image light is projected from the glass waveguide towards an eye of a user, the glass waveguide further configured such that image light transmits from it at approximately 90 degrees as referenced to the first inner surface, a protective inner layer positioned between the glass waveguide and the eye of the user, wherein the protective inner layer is further positioned to provide a first air gap between the glass waveguide and the protective inner layer, and a vision corrective optic mounted on the protective inner layer and positioned between the protective inner layer and the eye of the user. The glass waveguide may include at least one holographic surface. The at least one holographic surface includes a plurality of holographic surfaces. The glass waveguide may be positioned vertically in front of the eye of the user. The protective inner layer may have an outer surface upon which the vision corrective optic is mounted and the outer surface may be positioned vertically in front of the eye of the user. The head-worn see-through computer display may further include a protective outer layer positioned on a waveguide side opposite the protective inner layer, wherein the protective outer layer may be further positioned to provide a second air gap between the protective outer layer and the glass waveguide. The head-worn see-through computer display may further include an electrochromic surface controlled by a processor to controllably block at least a portion of scene light from reaching the glass waveguide. The electrochromic surface may be positioned between the protective outer layer and the glass waveguide. The electrochromic surface may be applied to the protective outer layer and the second air gap may be between the electrochromic surface and the glass waveguide. The protective outer layer may be photochromic. The vision corrective optic may include an elastomeric optic that attaches to the protective inner layer with surface tension.

Although embodiments of HWC have been described in language specific to features, systems, computer processes and/or methods, the appended claims are not necessarily limited to the specific features, systems, computer processes and/or methods described. Rather, the specific features, systems, computer processes and/or and methods are disclosed as non-limited example implementations of HWC. All documents referenced herein are hereby incorporated by reference.

What is claimed is:

1. An optical stack comprising:
   a waveguide;
   a vision corrective optic disposed on a first side of the waveguide;
   a protective layer disposed on a second side of the waveguide;
   an electrochromic layer disposed on the second side of the waveguide; and
   an air gap disposed between the waveguide and the protective layer.

2. The optical stack of claim 1, wherein the electrochromic layer is disposed between the waveguide and the protective layer.

3. The optical stack of claim 2, wherein the electrochromic layer is coupled directly to the protective layer.

4. The optical stack of claim 2, further comprising a substrate layer disposed between the electrochromic layer and the protective layer, wherein the electrochromic layer is coupled directly to the substrate layer.

5. The optical stack of claim 1, wherein:
   the first side of the waveguide is configured to face a user,
   the second side of the waveguide is configured to receive scene light, and
   the optical stack is configured to present the scene light to the user.

6. The optical stack of claim 5, wherein presenting image light to the user comprises presenting the image light via total internal reflection of the waveguide.

7. The optical stack of claim 1, wherein the electrochromic layer is configured to adjust an amount of scene light presented to a user based on a control signal provided by one or more processors in communication with a wearable head device.

* * * * *